United States Patent
Sohail et al.

(10) Patent No.: US 11,575,385 B2
(45) Date of Patent: Feb. 7, 2023

(54) CONTROLLING SYNCHRONOUS I/O INTERFACE

(71) Applicant: u-blox AG, Thalwil (CH)

(72) Inventors: Aneeb Sohail, Arlöv (SE); Hariharasudhan Vigneswaran, Lund (SE)

(73) Assignee: U-BLOX AG, Thalwil (CH)

( * ) Notice: Subject to any disclaimer, the term of this patent is extended or adjusted under 35 U.S.C. 154(b) by 0 days.

(21) Appl. No.: 17/091,072

(22) Filed: Nov. 6, 2020

(65) Prior Publication Data

US 2022/0149850 A1 May 12, 2022

(51) Int. Cl.
| | |
|---|---|
| *H03L 7/24* | (2006.01) |
| *G06F 13/38* | (2006.01) |
| *G06F 13/42* | (2006.01) |
| *H03L 7/04* | (2006.01) |
| *H03L 7/107* | (2006.01) |

(52) U.S. Cl.
CPC .............. *H03L 7/24* (2013.01); *G06F 13/385* (2013.01); *G06F 13/423* (2013.01); *H03L 7/04* (2013.01); *H03L 7/1075* (2013.01)

(58) Field of Classification Search
CPC .......................... G06F 13/385; G06F 13/423
USPC ........................................................ 327/365
See application file for complete search history.

(56) References Cited

U.S. PATENT DOCUMENTS

| | | | |
|---|---|---|---|
| 10,746,792 | B1 | 8/2020 | Diamant et al. |
| 2006/0140021 | A1* | 6/2006 | Ha .......................... G11C 8/18 365/233.14 |
| 2008/0078669 | A1 | 4/2008 | Pirttimaki et al. |
| 2012/0146705 | A1* | 6/2012 | Den Besten ......... H03K 17/145 327/333 |
| 2012/0150479 | A1 | 6/2012 | Balkan et al. |
| 2013/0318403 | A1 | 11/2013 | Kim et al. |

OTHER PUBLICATIONS

"Introduction to STM32 Microcontrollers Security", ST life. augmented, AN5156, Rev. 4, Feb. 2020, 52 pages.
Extended European Search Report dated Mar. 4, 2022, for corresponding application No. EP 21197436.5 (6 pgs).

* cited by examiner

*Primary Examiner* — Tomi Skibinski
(74) *Attorney, Agent, or Firm* — Finnegan, Henderson, Farabow, Garrett & Dunner LLP

(57) ABSTRACT

An electronic device includes: a first input node configured to receive a dock signal; a second input node configured to receive an activation signal or a deactivation signal; a filter circuit responsive to: (a) the activation signal to activate the filter circuit to block the dock signal; or (b) the deactivation signal to deactivate the filter circuit to pass the dock signal; and an output node configured for coupling to a synchronous I/O interface of an integrated circuit to control operation of the synchronous I/O interface.

17 Claims, 3 Drawing Sheets

CONTROLLING SYNCHRONOUS I/O INTERFACE

FIELD

The present disclosure relates generally to a circuit, and more particularly, to a circuit capable of disabling or enabling a synchronous input/output interface.

BACKGROUND

An exposed synchronous input/output (I/O) interface, e.g., a debug interface, of an electronic device is a fundamental problem when it comes to security of the device. Once attackers gain access to the interface, they can access any information onboard the device including security keys and other information of the device.

An expensive high-end device may provide an option for disabling the interface if necessary. However, an inexpensive device usually does not have such a provision. It is important to find a way to disable or enable an interface of such inexpensive chips.

SUMMARY

According to some embodiments of the present disclosure, there is provided an electronic device. The electronic device includes: a first input node configured to receive a clock signal; a second input node configured to receive an activation signal or a deactivation signal; a filter circuit responsive to: (a) the activation signal to activate the filter circuit to block the clock signal, or (b) the deactivation signal to deactivate the filter circuit to pass the clock signal; and an output node configured for coupling to a synchronous input/output (I/O) interface of an integrated circuit to control operation of the synchronous I/O interface.

According to some embodiments of the present disclosure, there is provided an apparatus. The apparatus includes: an integrated circuit including: a synchronous I/O interface; and a general purpose I/O pin configured to provide an activation signal or a deactivation signal; and a filter circuit: coupled to receive a clock signal from an external clocked circuit; and coupled to receive the activation signal or the deactivation signal from the integrated circuit; and configured to block the clock signal based on the activation signal or pass the clock signal to the integrated circuit based on the deactivation signal.

According to some embodiments of the present disclosure, there is also provided a method for controlling a synchronous I/O interface included in an integrated circuit. The method includes receiving, by a filter circuit, from an external clocked circuit; a clock signal; transmitting, from the integrated circuit, to the filter circuit, an activation signal configured to activate the filter circuit; and blocking, by the filter circuit, the clock signal to disable operation of the synchronous I/O interface in response to the activation signal. The method may further include: transmitting, from the integrated circuit, to the filter circuit, a deactivation signal configured to deactivate the filter circuit; and passing, by the filter circuit, to the synchronous I/O interface, the clock signal to enable operation of the synchronous I/O interface in response to the deactivation signal.

DETAILED DESCRIPTION

Figure 1:
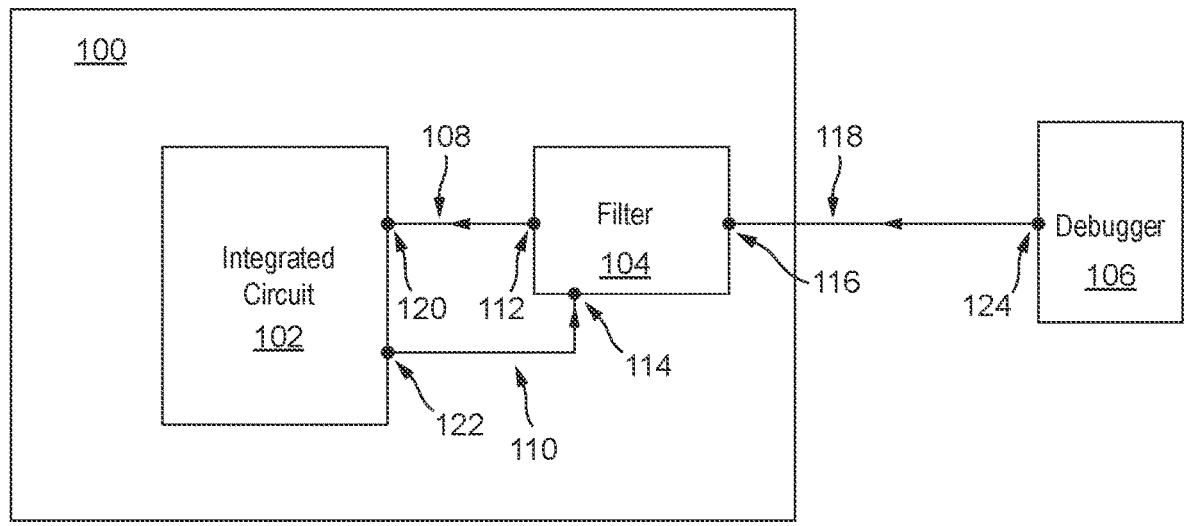
FIG. 1 is a schematic diagram illustrating an apparatus for controlling a synchronous I/O interface, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of systems, apparatuses, and methods consistent with aspects related to the present disclosure as recited in the appended claims.

An exposed synchronous I/O interface, e.g., a debug interface, of a system on a chip (SoC) provides beneficial usage in hardware configuration and control. However, the existence of the debug interface also increases the risk and vulnerability of the SoC. An attacker may illegitimately access the debug interface and obtain confidential information stored in the SoC. An expensive high-end device may provide solutions for disabling the debug interface when necessary. However, inexpensive devices, such as internee-of-things (IoT) devices, usually do not have such provisions.

A simple Zener diode functioning as an electronic fuse may provide some protection for a debug interface. For example, a Zener diode may be connected to a clock pin of a debug interface, and when the debug interface needs to be disabled, a sufficient amount of current can be passed through the diode to burn it off. However, this burning process is difficult to control and may lead to a burnt printed circuit board (PCB). It is therefore desirable to have a convenient and inexpensive technique to control a debug interface.

Embodiments of the present disclosure provide an apparatus having a synchronous I/O interface, e.g., a debug interface, that can be disabled or enabled by a filter circuit included in the apparatus. The apparatus includes an integrated circuit configured to transmit an activation signal or a deactivation signal to the filter circuit. The filter circuit is coupled to an external clocked circuit, e.g., an external debugger, and configured to receive a clock signal from the debugger. The filter circuit is disabled and passes the clock signal to the debug interface in response to the deactivation signal. On the other hand, the filter circuit is enabled and blocks the clock signal in response to the activation signal. When the filter circuit is disabled, operation of the debug interface is enabled. On the other hand, when the filter circuit is enabled, operation of the debug interface is disabled.

Embodiments disclosed in the present disclosure have one or more technical effects. By inserting a filter circuit between the debug interface and the external debugger, operation of the debug interface is disabled or enabled using the activation signal or the deactivation signal sent to the filter circuit, respectively. In this way, built-in debug circuitry inside a chip can be easily controlled without modifying the chip, leading to enhanced security of the chip at a low cost.

Moreover, embodiments disclosed in the present disclosure provide a roadmap to a universal solution, that is, a technique for disabling or enabling any types of synchronous I/O interfaces, by inserting a filter circuit between a synchronous I/O interface and an external clocked circuit and controlling activation or deactivation of the filter circuit with an activation signal or deactivation signal, respectively.

FIG. 1 is a schematic diagram illustrating an apparatus 100 for controlling a synchronous I/O interface, e.g., a debug interface, consistent with some embodiments of the present disclosure. Referring to FIG. 1, apparatus 100 includes an integrated circuit 102 and a filter 104. Integrated circuit 102 includes a debug interface configured to communicate with filter 104. The debug interface includes a clock pin 120 and data pins (not shown). Integrated circuit 102 is configured to transmit an activation signal or a deactivation signal to filter 104 via a path 110. Integrated circuit 102 may transmit the activation signal or the deactivation signal to filter 104 through a spare I/O pin 122. Spare I/O pin 122 may be a general purpose input output (GPIO) pin that is designed for implementation of apparatus 100 in a third party's device and so is available in integrated circuit 102, but is not connected to any external pin of the third party's device.

Figure 2:
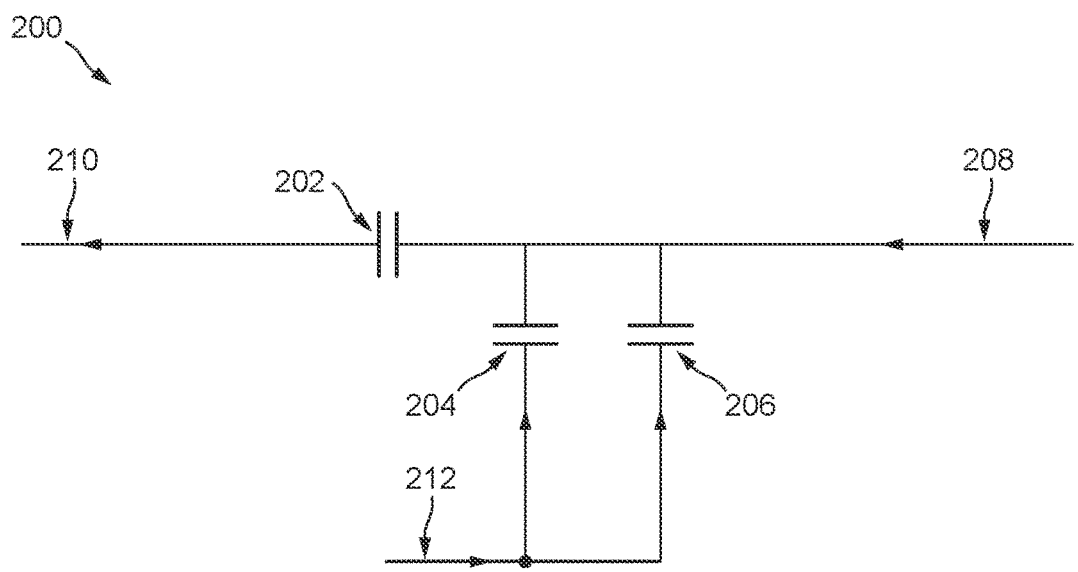
FIG. 2 is a schematic diagram illustrating an exemplary filter circuit for controlling a synchronous I/O interface, consistent with some embodiments of the present disclosure.
Figure 3:
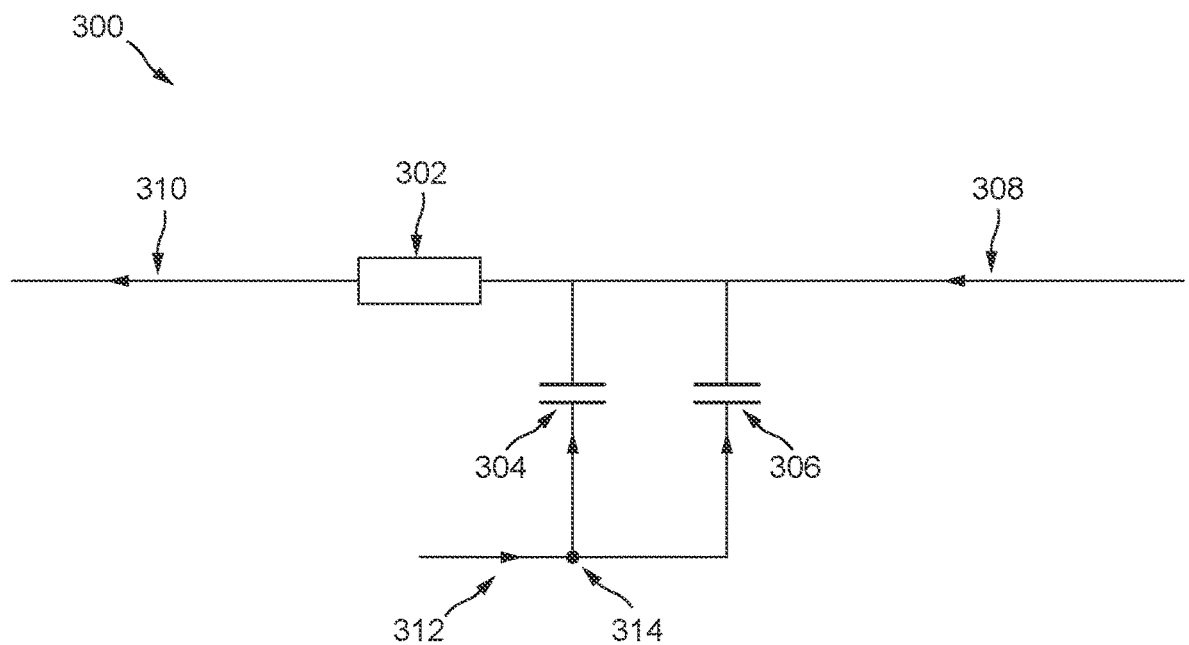
FIG. 3 is a schematic diagram illustrating another exemplary filter circuit for controlling a synchronous I/O interface, consistent with some embodiments of the present disclosure.
Figure 4:
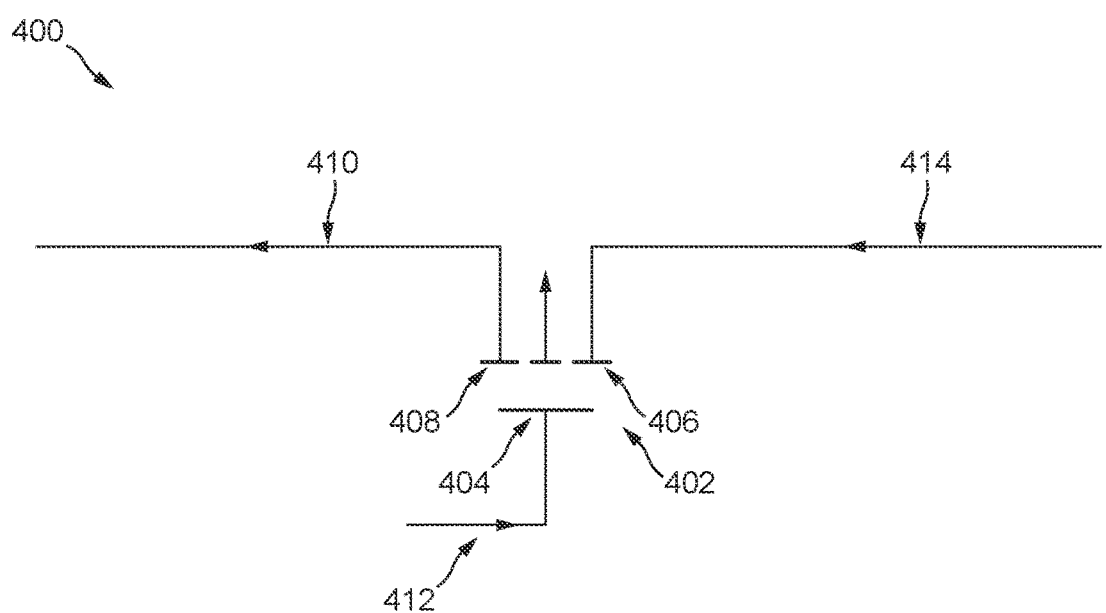
FIG. 4 is a schematic diagram illustrating another exemplary filter circuit for controlling a synchronous I/O interface, consistent with some embodiments of the present disclosure.

Filter 104 includes a node 114 configured to receive the activation signal or the deactivation signal transmitted from integrated circuit 102. Filter 104 includes a node 116 configured to receive a dock signal transmitted from a node 124 of an external debugger 106 via a path 118. Filter 104 includes a filter circuit (not shown) that can block or pass the dock signal received from debugger 106 in response to the activation signal or the deactivation signal, respectively. The filter circuit can be any circuit capable of filtering out the dock signal received from debugger 106. For example, the filter circuit may be at least one of: a capacitor circuit, a resistor-capacitor (RC) circuit, an inductor-capacitor (LC) circuit, a resistor-inductor (RL) circuit, a resistor-inductor-capacitor (RLC) circuit, a transistor, or a combination thereof. Some exemplary embodiments of the filter circuit are shown in FIG. 2-FIG. 4. Filter 104 includes a node 112 configured to transmit the clock signal to integrated circuit 102 via a path 108, when the filter circuit is deactivated in response to the deactivation signal. On the other hand, when the filter circuit is activated in response to the activation signal, the filter circuit filters out the clock signal received from debugger 106. In an embodiment, integrated circuit 102 is external to the filter circuit, but implemented on the same module as the filter circuit, for example, on the same PCB.

In an embodiment, the debug interface included in integrated circuit 102 is a serial wire debug (SWD) interface that is synchronous with two signals, i.e., a data signal and a clock signal. A data pin (not shown) of the debug interface may be used for sending data to external debugger 106 or receiving data from the debugger so that the debugger can read/write an internal memory of integrated circuit 102 through the SWD interface. Filter 104 is coupled to the clock pin 120 of the debug interface and external debugger 106. Filter 104 receives an activation signal or a deactivation signal transmitted through spare I/O pin 122 of integrated circuit 102. As described above, spare I/O pin 122 may be a general-purpose input/output (GPIO) pin, Filter 104 also receives the clock signal from debugger 106 on node 116 via path 118. In an unprogrammed default state, GPIO pin 122 is unconfigured and thereby in a floating state, and filter 104 may function as a high pass filter, allowing transmission of the clock signal at the operable frequencies of the debug interface. In this default state, the debug interface can be used to program integrated circuit 102 and this programming enables the GPIO pin 122 to transmit a deactivation signal. When the deactivation signal is transmitted from GPIO pin 122, the deactivation signal causes a change of the property of the filter circuit, for example, by electrically connecting additional capacitors of the filter circuit, so that the filter circuit can block the clock signal operable frequencies of the debug interface. Afterwards, when an activation signal is transmitted from the GPIO pin 122, the activation signal again changes the property of the filter circuit, for example, by disconnecting the additional capacitors of the filter circuit, so that the filter circuit can pass the clock signal operable frequencies of the debug interface received from debugger 106. In an embodiment, the activation of the filter circuit corresponds to an active low state of the filter circuit and the deactivation of the filter circuit corresponds to a floating state of the filter circuit.

In this way, the filter circuit of filter 104 blocks or passes the clock signal, based on the activation signal or the deactivation signal, respectively. When the filter circuit blocks the dock signal in response to the activation signal, operation of the debug interface in integrated circuit 102 is disabled. On the other hand, when filter 104 passes the dock signal responsive to the deactivation signal, operation of the debug interface in integrated circuit 102 is enabled.

Integrated circuit 102 may transmit the activation signal or the deactivation signal to filter 104 based on a triggering event. In an embodiment, the triggering event may be entering a password to unlock the debug interface. For example, in an inter-integrated circuit (I2C) interface, a user having authorization to use the interface may lock the I2C bus using a password. This password can be input to the control logic in integrated circuit 102 through an input channel, for example, a Bluetooth, a WiFi, or a universal asynchronous receiver-transmitter (UART). Detection of the input password may trigger integrated circuit 102 to transmit a deactivation signal to filter 104.

In another embodiment, the triggering event may be a button pressing event. For example, a button of apparatus 100 may be pressed when the debug interface needs to be accessed during service returns, quality returns, or re-production at the factory. In an embodiment, an access permission, e.g., through a passcode, is required to access the button.

In another embodiment, the triggering event may be a sensor triggering event. The sensor may be an accelerometer sensor or any other motion sensor that is connected to apparatus 100 and senses a movement of the apparatus. When the apparatus starts to move, the apparatus may open its serial peripheral interface (SPI) so that the sensor may send data over the interface. On the other hand, when the apparatus is static, the sensor does not send data to the apparatus and the interface is locked.

In an embodiment, apparatus 100 may be a module implemented in a third party's system. In this embodiment, the host system may control a debug logic using an external control and/or a spare I/O pin of integrated circuit 102. The host system may be any third party device or system in which apparatus 100 is implemented.

By inserting filter 104 between the debug interface of integrated circuit 102 and external debugger 106, operation of the debug interface is disabled or enabled using the activation signal or the deactivation signal transmitted from integrated circuit 102, respectively. In this way, a built-in debug interface inside a chip can be controlled without modifying the chip, leading to enhanced security of the chip at a low cost.

The above described embodiments are directed to a technique for enabling or disabling of a debug interface on a chip, to provide protection from illegitimate access to confidential information on the chip exploited by attackers. However, the application of the technique is not so limited. The technique may be used in controlling operation of any other types of synchronous I/O interfaces. For example, in some embodiments, instead of implementing in a debug interface, the filter circuit operating responsive to an activation signal or a deactivation signal may be used to control any other synchronous I/O interfaces, such as a serial peripheral interface (SPI) and its variants (e.g., queued serial peripheral interface (OSPI), octal serial peripheral interface (OSPI), etc.), a media-independent interface (Mil), and an inter-IC communication interface. In these embodiments, debugger 106 may be replaced by any other external clocked circuit. The filter circuit, for example, as shown below in FIG. 2-FIG. 4, may be used to disable or enable operation of these synchronous I/O interfaces.

FIG. 2 is a schematic diagram illustrating an exemplary filter circuit 200 for controlling a synchronous I/O interface, consistent with some embodiments of the present disclosure. Referring to FIG. 2, filter circuit 200 includes capacitors 202, 204, and 206. Filter circuit 200 receives a dock signal, via a path 208, from an external docked circuit. The external docked circuit can be any docked circuit that can read and write an internal memory of an integrated circuit through the synchronous I/O interface. In an embodiment, the external docked circuit is a debugger, such as debugger 106 of FIG. 1, and the synchronous I/O interface is a debug interface, such as the debug interface included in integrated circuit 102 of FIG. 1.

Filter circuit 200 receives an activation signal or a deactivation signal, via a path 212, from the integrated circuit including the synchronous I/O interface. The activation signal or the deactivation signal is provided to capacitors 204 and 206. When the activation signal is provided to capacitors 204 and 206, the activation signal electrically connects the capacitors so that filter circuit 200 is activated to function as a signal filter and filters out the dock signal received from the external docked circuit, and operation of the synchronous I/O interface is thus disabled. In an embodiment, capacitors 204 and 206 are connected to ground for an effective filtering.

In another embodiment, the deactivation signal is provided to capacitors 204 and 206. The deactivation signal may electrically disconnect the capacitors from the circuit. Filter circuit 200 is then deactivated and passes the dock signal received from the external docked circuit, and operation of the synchronous I/O interface is thus enabled. In this embodiment, filter circuit 200 may function as a high pass filter to pass the operable frequencies of the synchronous I/O interface. The clock signal passed from filter circuit 200 is transmitted to the clock pin of the synchronous I/O interface via a path 210. In an embodiment, each of the paths for the activation signal or the deactivation signal to capacitors 204 and 206 is coupled to a switch (not shown), and the activation signal or the deactivation signal controls the closing or opening state of the switch to connect/disconnect capacitors 204 and 206 to/from the circuit. In an embodiment, filter circuit 200 and the synchronous I/O interface may be included in a module that can be implemented in a third party's device.

FIG. 2 shows an example of activating or deactivating two capacitors, i.e., capacitors 204 and 206. However, the capacitor circuit is not so limited. In some embodiments, only one or more than two capacitors may be activated or deactivated. For example, in an embodiment, instead of capacitors 204 and 206, only one capacitor (capacitor 204 or 206) may be implemented in the filter circuit and the activation signal or the deactivation signal is transmitted to that capacitor.

The capacitors of filter circuit 200 may be selected such that the capacitances of the capacitors match the security level of the product. For example, less expensive capacitors having smaller capacitances may be used for a simple, short-range connection (e.g., Bluetooth), while more expensive capacitor shaving larger capacitances may be used for medical and other IoT applications.

FIG. 3 is a schematic diagram illustrating another exemplary filter circuit 300 for controlling a synchronous I/O interface, consistent with some embodiments of the present disclosure Referring to FIG. 3, filter circuit 300 includes a resistor 302, and capacitors 304 and 306 connected in parallel. Filter circuit 300 receives a clock signal, via a path 308, from an external clocked circuit. The external clocked circuit can be any clocked circuit. In an embodiment, the external clocked circuit is a debugger, such as debugger 106 of FIG. 1, and the synchronous I/O interface is a debug interface, such as the debug interface included in integrated circuit 102 of FIG. 1.

Referring to FIG. 3, filter circuit 300 receives an activation signal or a deactivation signal, via a path 312, from an integrated circuit including the synchronous I/O interface. The activation signal or the deactivation signal is provided to capacitors 304 and 306, through a node 314. In an embodiment, the activation signal is provided to the capacitors 304 and 306. The activation signal may change the property of filter circuit 300 by electrically connecting the capacitors to the circuit. Filter circuit 300 is then activated to function as a signal filter and filters out the clock signal received from the external clocked circuit, and operation of the synchronous I/O interface is thus disabled.

In another embodiment, the deactivation signal is provided to capacitors 304 and 306. The deactivation signal may change the property of filter circuit 300 by electrically disconnecting the capacitors from the circuit. Filter circuit 300 is then deactivated and passes the clock signal received from the external clocked circuit, and operation of the synchronous I/O interface is thus enabled. The clock signal is transmitted to the clock pin of the synchronous I/O interface via a path 310.

In an embodiment, instead of two capacitors, only one capacitor (e.g., capacitor 304 or 306) or more than two capacitors may be implemented in the circuit to receive the activation signal or the deactivation signal. In an embodiment, resistor 302 may be interchanged with one of capacitors 304 and 306, and the activation signal or the deactivation signal may be provided to node 314. In an embodiment, filter circuit 300 and the synchronous I/O interface may be included in a module that can be implemented in a third party's system or device.

In an embodiment, integrated circuit 102 is a third party's integrated circuit and is implemented on the same module (e.g., a PCB) with filter 104. In this embodiment, integrated circuit 102 and filter 104 are distinct circuits.

FIG. 4 is a schematic diagram illustrating another exemplary filter circuit 400 for controlling a synchronous I/O interface, consistent with some embodiments of the present disclosure. Referring to FIG. 4, filter circuit 400 includes a metal-oxide-semiconductor field-effect transistor (MOSFET) 402. However, the transistor is not so limited, and any type of transistor can be implemented in the filter circuit. Transistor 402 includes a gate 404, a source 406, and a drain 408, Filter circuit 400 receives a clock signal, via a path 414, from an external clocked circuit. The received clock signal is provided to source 406 of transistor 402. The external clocked circuit can be any clocked circuit. In an embodiment, the external clocked circuit is a debugger, such as debugger 106 of FIG. 1, and the synchronous I/O interface is a debug interface, such as the debug interface included in integrated circuit 102 of FIG. 1.

Filter circuit 400 receives an activation signal or a deactivation signal, via a path 412, from an integrated circuit including the synchronous I/O interface. The activation signal or the deactivation signal is provided to gate 404 of transistor 402. In an embodiment, the activation signal is provided to gate 404 so that filter circuit 400 is activated and filters out the clock signal received from the external clocked circuit, and operation of the synchronous I/O interface is thus disabled.

In another embodiment, the deactivation signal is provided to gate 404 of transistor 402 so that filter circuit 400 is deactivated and passes the clock signal received from the external clocked circuit, and operation of the synchronous I/O interface is thus enabled. The clock signal is transmitted to the synchronous I/O interface via a path 410. In an embodiment, filter circuit 400 and the synchronous I/O interface may form a module that can be implemented in a third party's system or device.

FIGS. 2-4 show only a few exemplary embodiments of the filter circuit. However, the configuration of the filter circuit is not so limited. Any type of circuit or combination of circuits capable of filtering out a clock signal may be used. For example, the filter circuit may be at least one of: a capacitor circuit, a resistor-capacitor (RC) circuit, an inductor-capacitor (LC) circuit, a resistor-inductor (RL) circuit, a resistor-inductor-capacitor (RLC) circuit, one or more transistors, or a combination thereof.

Figure 5:
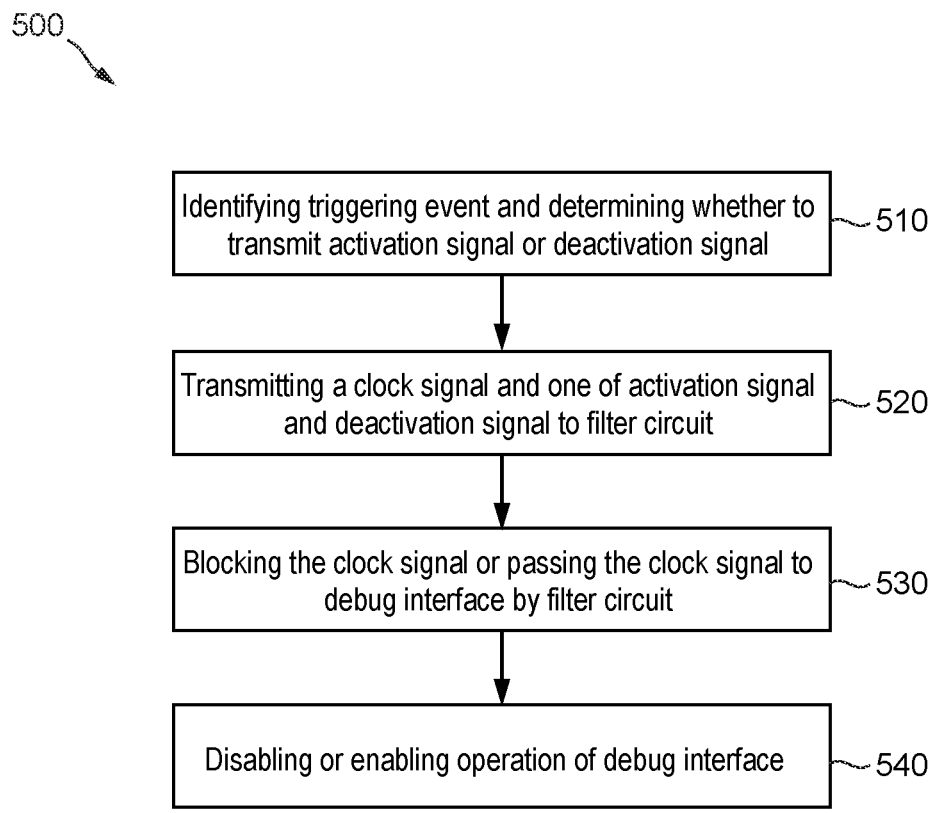
FIG. 5 is a method for controlling a synchronous I/O interface included in an integrated circuit, consistent with some embodiments of the present disclosure.

FIG. 5 shows a method 500 for controlling a debug interface included in an integrated circuit, consistent with some embodiments of the present disclosure, Method 500 may be performed by an apparatus, such as apparatus 100 of FIG. 1. Referring to FIG. 5, method 500 includes a step 510 of identifying a triggering event and determining whether to transmit an activation signal or a deactivation signal. For example, integrated circuit 102 of apparatus 100 (FIG. 1) identifies an event that triggers transmission of either an activation signal or a deactivation signal.

Method 500 includes a step 520 of transmitting a clock signal and one of the activation signal and the deactivation signal to a filter circuit, such as the filter circuit included in filter 104 of FIG. 1. For example, an external debugger, such as debugger 106 of FIG. 1, transmits the clock signal to the filter circuit. Integrated circuit 102 transmits the activation signal or the deactivation signal based on the determination in step 510. In an embodiment, the clock signal and one of the activation signal and the deactivation signal may be transmitted substantially simultaneously to the filter circuit. In another embodiment, the activation signal or the deactivation signal is always transmitted to the filter circuit, regardless of the clock signal transmission.

Method 500 includes a step 530 of blocking the clock signal or passing the clock signal to a debug interface, such as the debug interface included in integrated circuit 102 of FIG. 1. The blocking or passing of the clock signal is performed by the filter circuit. For example, responsive to the activation signal received from integrated circuit 102 the filter circuit is activated and filters out the clock signal, and responsive to the deactivation signal received from integrated circuit 102, the filter circuit is deactivated and passes the clock signal.

Method 500 includes a step 540 of disabling or enabling operation of the debug interface. For example, when the filter circuit is activated by the activation signal and filters out the clock signal, operation of the debug interface is disabled. On the other hand, when the filter circuit is deactivated by the deactivation signal and passes the clock signal, operation of the debug interface is enabled.

Method 500 is performed to disable or enable a debug interface included in an integrated circuit. However, the application of the method is not so limited. In some embodiments, method 500 can be used to control any synchronous I/O interfaces, for example, an SPI and its variants (e.g., QSPI, OSPI, etc.), MH and its variants (reduced media-independent interface (RIM), gigabit media-independent interface (GUI), reduced gigabit media-independent interface (RGMII), etc.) and an inter-IC communication interface. In these embodiments, instead of a debugger, any external clocked circuit capable of reading and writing an internal memory of an integrated circuit through a synchronous I/O interface can be used.

The steps of the example methods set forth herein are not necessarily required to be performed in the order described, and the order of the steps of such methods should be understood to be merely example. For example, two blocks shown in succession may, in fact, be executed substantially concurrently, or the blocks may sometimes be executed in the reverse order, depending upon the functionality involved. Likewise, additional steps may be included in such methods, and certain steps may be omitted or combined, in methods consistent with various embodiments.

The described embodiments are not mutually exclusive, and elements, components, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment" "some embodiments" or "another embodiment" in various places in the present disclosure do not all necessarily refer to the same embodiment, nor are separate or alternative embodiments necessarily mutually exclusive of other embodiments.

As used in the present disclosure, the word "exemplary" is used herein to mean serving as an example, instance, or illustration. Any aspect or design described herein as "exemplary" is not necessarily to be construed as preferred or advantageous over other aspects or designs. Rather, use of the word is intended to present concepts in a concrete fashion.

As used in the present disclosure, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B. or C, then, unless specifically stated otherwise or feasible, the database may include A, or B, or C, or A and B, or A and C, or B and C, or A and B and C.

Additionally, the articles "a" and as used in the present disclosure and the appended claims should generally be construed to mean"one or more" unless specified otherwise or clear from context to be directed to a singular form.

Unless explicitly stated otherwise, each numerical value and range should be interpreted as being approximate as if the word "about" or "approximately" preceded the value of the value or range.

Although the elements in the following method claims, if any, are recited in a particular sequence, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment, Conversely, various features of the specification, which are, for brevity, described in the context of a single embodiment, may also be provided separately or in any suitable sub-combination or as suitable in any other described embodiment of the specification. Certain features described in the context of various embodiments are not essential features of those embodiments, unless noted as such.

It will be further understood that various modifications, alternatives and variations in the details, materials, and arrangements of the parts which have been described and illustrated in order to explain the nature of described embodiments may be made by those skilled in the art without departing from the scope. Accordingly, the following claims embrace all such alternatives, modifications and variations that fall within the terms of the claims.

What is claimed is:

1. An electronic device comprising:
   a first input node configured to receive a clock signal;
   a second input node configured to receive an activation signal or a deactivation signal;
   a filter circuit responsive to: (a) the activation signal to activate the filter circuit to block the clock signal, or (b) the deactivation signal to deactivate the filter circuit to pass the clock signal; and
   an output node configured for coupling to a synchronous input/output (I/O) interface of an integrated circuit to control operation of the synchronous I/O interface,
   wherein the first input node is configured for coupling to an external clocked circuit to receive the clock signal, and the second input node is configured for coupling to the integrated circuit to receive the activation signal or the deactivation signal, and
   wherein the external clocked circuit is a debugger, the synchronous I/O interface is a serial wire debug (SWD) interface, and the second input node of the electronic device is configured for coupling to a spare I/O pin of the integrated circuit to receive the activation signal or the deactivation signal.

2. The electronic device of claim 1, wherein the output node is configured to:
   output the clock signal to the synchronous I/O interface, when the filter circuit is deactivated, to enable the synchronous I/O interface, and
   block the clock signal when the filter circuit is activated, to disable the synchronous I/O interface.

3. The electronic device of claim 1, wherein the filter circuit comprises at least one of: a capacitor circuit, a resistor-capacitor (RC) circuit, an inductor-capacitor (LC) circuit, a resistor-inductor (RL) circuit, a resistor-inductor-capacitor (RLC) circuit, or a combination thereof.

4. The electronic device of claim 3, wherein the filter circuit comprises at least one capacitor, and the activation signal is configured to activate the at least one capacitor so that the filter circuit blocks the clock signal.

5. The electronic component of claim 1, wherein the filter circuit comprises at least one transistor, and the activation signal or the deactivation signal is configured to activate or deactivate a gate of the at least one transistor so that the filter circuit respectively blocks or passes the clock signal.

6. The electronic component of claim 1, wherein the filter circuit comprises:
   at least one transistor, and
   at least one of: a capacitor circuit, a resistor-capacitor (RC) circuit, an inductor-capacitor (LC) circuit, a resistor-inductor (RL) circuit, a resistor-inductor-capacitor (RLC) circuit, or a combination thereof.

7. An apparatus, comprising:
   an integrated circuit including:
      a synchronous input/output (I/O) interface; and
      a general purpose I/O pin configured to provide an activation signal or a deactivation signal; and
   a filter circuit:
      coupled to receive a clock signal from an external clocked circuit and coupled to receive the activation signal or the deactivation signal from the integrated circuit; and
      configured to block the clock signal based on the activation signal or pass the clock signal to the integrated circuit based on the deactivation signal,
   wherein the external clocked circuit is a debugger, the synchronous I/O interface is a serial wire debug (SWD) interface, and the clock signal passed by the filter circuit is received through a clock pin of the SWD interface.

8. The apparatus of claim 7, wherein:
   operation of the synchronous I/O interface is enabled when the filter circuit is deactivated by the deactivation signal and passes the clock signal, or
   operation of the synchronous I/O interface is disabled when the filter circuit is activated by the activation signal and blocks the clock signal.

9. The apparatus of claim 7, wherein the filter circuit comprises at least one of: a capacitor circuit, a resistor-capacitor (RC) circuit, an inductor-capacitor (LC) circuit, a resistor-inductor (RL) circuit, a resistor-inductor-capacitor (RLC) circuit, or a combination thereof.

10. The apparatus of claim 9, wherein the filter circuit comprises at least one capacitor, and the activation signal or the deactivation signal is configured to activate or deactivate the at least one capacitor so that the filter circuit respectively blocks or passes the clock signal.

11. The apparatus of claim 7, wherein:
   wherein the filter circuit comprises at least one transistor, and the activation signal or the deactivation signal is configured to activate or deactivate a gate of the at least one transistor so that the filter circuit respectively blocks or passes the clock signal.

12. The apparatus of claim 7, wherein the filter circuit comprises:
   at least one transistor, and
   at least one of: a capacitor circuit, a resistor-capacitor (RC) circuit, an inductor-capacitor (LC) circuit, a resistor-inductor (RL) circuit, a resistor-inductor-capacitor (RLC) circuit, or a combination thereof.

13. The apparatus of claim 7, wherein the activation signal or the deactivation signal is transmitted through a spare I/O pin of the integrated circuit.

14. The apparatus of claim 13, wherein the integrated circuit is further configured to:
   determine whether to transmit the activation signal or the deactivation signal based on a trigger event, and
   control the spare I/O pin to output the activation signal or the deactivation signal to the filter circuit based on the determination.

15. A method for controlling a synchronous input/output (I/O) interface included in an integrated circuit, comprising:
   receiving, by a filter circuit, from an external clocked circuit, a clock signal;
   transmitting, from the integrated circuit, to the filter circuit, an activation signal configured to activate the filter circuit; and
   blocking, by the filter circuit, the clock signal to disable operation of the synchronous I/O interface in response to the activation signal,
   wherein the filter circuit comprises: a first input node configured for coupling to the external clocked circuit to receive the clock signal, and a second input node configured for coupling to the integrated circuit to receive the activation signal or the deactivation signal, and
   wherein the external clocked circuit is a debugger, the synchronous I/O interface is a serial wire debug (SWD) interface, and the second input node of the filter circuit is configured for coupling to a spare I/O pin of the integrated circuit to receive the activation signal or the deactivation signal.

16. The method of claim 15, the method further comprising:
   transmitting, from the integrated circuit, to the filter circuit, a deactivation signal configured to deactivate the filter circuit; and
   passing, by the filter circuit, to the synchronous I/O interface, the clock signal to enable operation of the synchronous I/O interface in response to the deactivation signal.

17. The method of claim 16, further comprising:
   identifying a trigger event that determines selection of the activation signal or the deactivation signal; and
   controlling, responsive to the identified trigger event, a spare I/O pin of the integrated circuit to transmit the activation signal or the deactivation signal to the filter circuit.

* * * * *